US006600769B2

(12) United States Patent
Simons et al.

(10) Patent No.: US 6,600,769 B2
(45) Date of Patent: Jul. 29, 2003

(54) DEVICE AND METHOD FOR MANUFACTURING A PREFORM

(75) Inventors: Dennis Robert Simons, Eindhoven (NL); Henrikus Lambertus Maria Jansen, Bergeijk (NL)

(73) Assignee: Draka Fibre Technology B.V., Eindhoven (NL)

( * ) Notice: Subject to any disclaimer, the term of this patent is extended or adjusted under 35 U.S.C. 154(b) by 10 days.

(21) Appl. No.: 09/986,903

(22) Filed: Nov. 13, 2001

(65) Prior Publication Data

US 2002/0097774 A1 Jul. 25, 2002

(30) Foreign Application Priority Data

Nov. 17, 2000 (NL) .............................................. 1016644

(51) Int. Cl.⁷ ................................................ H05B 6/22
(52) U.S. Cl. ...................................... 373/157; 373/141
(58) Field of Search .................................. 373/139–145, 373/151, 156, 157; 219/418, 419, 420; 422/248; 432/262; 65/32.5, 157, 424, 435; 264/85; 277/431, 906

(56) References Cited

U.S. PATENT DOCUMENTS 4,030,901 A * 6/1977 Kaiser .......................... 65/424
5,970,083 A  10/1999 Orcel et al. ................. 373/157

FOREIGN PATENT DOCUMENTS

FR    0 795 519 A1   9/1997
JP    6-239639        8/1994

* cited by examiner

*Primary Examiner*—Tu Ba Hoang
(74) *Attorney, Agent, or Firm*—Oblon, Spivak, McClelland, Maier & Neustad, P.C.

(57) ABSTRACT

The invention relates to a device for manufacturing a preform, wherein a carrier tube is collapsed to a preform, which device comprises a heating element forming a cylindrical envelope, which envelope defines an annular inlet opening and an annular outlet opening at opposite ends of the envelope, a carrier tube being present within the cylindrical envelope, between said openings, the heating element being movable in axial direction with respect to the carrier tube, and means for supplying a non-oxidizing gas to the space between the carrier tube and the envelope.

6 Claims, 1 Drawing Sheet

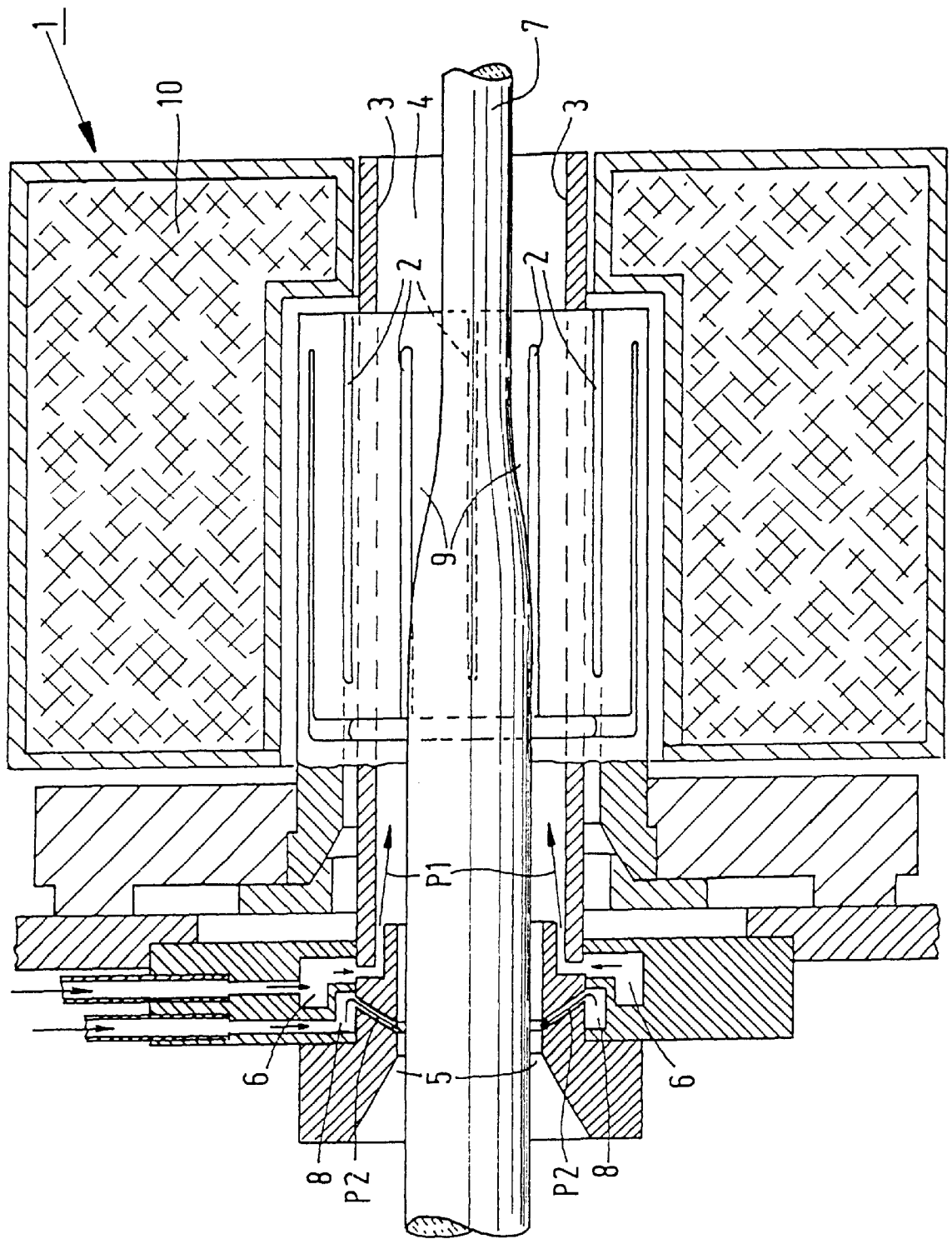

DEVICE AND METHOD FOR MANUFACTURING A PREFORM

The present invention relates to a device for manufacturing a preform, wherein a carrier tube is collapsed to a preform, which device comprises a heating element forming a cylindrical envelope, which envelope defines an annular inlet opening and an annular outlet opening at opposite ends of the envelope, a carrier tube being present within the cylindrical envelope, between said openings, the heating element being movable in axial direction with respect to the carrier tube, and means for supplying a non-oxidizing gas to the space between the carrier tube and the envelope. The present invention furthermore relates to a method for manufacturing a preform, using the present device.

Such a device is known per se from U.S. Pat. No. 5,970,083. The device that is known therefrom comprises a graphite furnace which surrounds a cylindrical envelope, with a carrier tube being movable within the cylindrical envelope in the longitudinal direction thereof. Said device is used for collapsing a primary preform which is in the form of a hollow rod approximately 30 mm in diameter, which must be transformed into a preform that can be used for drawing the optical fibre, that is, a solid rod having a diameter of approximately 20 mm. This transformation occurs principally towards the middle of the furnace, where a temperature of approximately 2000° C. prevails. The cylindrical envelope comprises an inlet opening and an outlet opening, both openings including two rings of conduits through which a non-oxidizing gas is passed. Said annular conduits are inclined at an angle to the axial direction of the envelope, the non-oxidizing gas being injected in two conical gas curtains by the annular conduits. The gas that is thus injected is directed away from the envelope, such that any entry into the envelope of air that could cause combustion of the graphite furnace is prevented.

The present inventors have found that the high temperature that is required for the collapse process may lead to combustion of the interior of the cylindrical envelope, which includes a carbon tube, when oxygen from the ambient air comes into contact with said carbon tube. The combustion products that are formed upon combustion can subsequently deposit on the carrier tube, which impurities may have an adverse effect on the optical properties and/or the strength of the glass fibre to be manufactured eventually. Another effect of the high temperature that prevails in the cylindrical envelope is that a small amount of $SiO_2$, namely the material from which the carrier tube is made, will evaporate. Said $SiO_2$ can react with the carbon of the interior of the cylindrical envelope to form SiC, which deposits on the inner wall. Experiments have shown that said SiC can become detached from the carbon inner wall of the furnace and subsequently adhere to the hot and slightly softened carrier tube. The presence of such impurities on the carrier tube must be prevented, because said carrier tube is converted into an optical glass fibre in a drawing tower after being collapsed into a preform. Although the above-discussed US patent discloses a device wherein the entry of ambient air is prevented by providing a double gas curtain at both furnace ends and flushing a gas in the furnace space between the carrier tube and the inner wall of the furnace, which is claimed to minimize combustion of the carbon inner tube, said known device does not provide an adequate discharge of evaporated $SiO_2$ from the carrier tube, as a result of which the formation of SiC and the deposition thereof on the exterior of the carrier tube is not prevented under all circumstances.

The object of the present invention is thus to provide a device and a method for manufacturing a preform wherein the aforesaid problems of the prior art are prevented.

According to the present invention, the invention as referred to in the introduction is characterized in that the means for supplying a non-oxidizing gas are disposed near the annular inlet opening, said means comprising:

i) an element for flushing the space between the carrier tube and the envelope, which element, which comprises an annular injection chamber, is disposed near the annular inlet opening and which carries a non-oxidizing gas past the carrier tube in the direction of the annular outlet opening under laminar flow, and ii) an element for supplying a non-oxidizing gas to the annular inlet opening, which element is disposed upstream of the element according to i), which element ii) comprises an annular injection chamber, which carries a non-oxidizing gas past the carrier tube in a direction opposed to the direction of the non-oxidizing gas from element i) so as to prevent the entry of ambient air on the side of the annular inlet opening.

The present inventors have thus found a solution for the aforesaid problems by flushing a non-oxidizing gas in the space between the carrier tube and the envelope while also forming a gas curtain of a non-oxidizing gas on the outside of the carrier tube, and that on one side of the furnace only, namely near the annular inlet opening. The use of an internal flushing step on one side of the furnace only, namely near the annular inlet opening, prevents the possible occurrence of swirls caused by opposed gas flows in the space between the cylindrical envelope and the carrier tube interior. More in particular, any impurities resulting from the above-discussed factors will leave the furnace on the other side, namely at the annular outlet opening, together with the non-oxidizing gas flow. When such a method is used, deposition of silicon-containing compounds, such as SiC, in the hot zone of the carbon inner tube in the furnace can be prevented because no accumulation of combustion products occurs in the space between the carrier tube and the envelope. Experiments have shown that cubic and hexagonal SiC is deposited on the carbon inner tube at temperatures above 1900° C. of the carbon inner tube. Such crystals of cubic SiC can become detached from the inner wall of the cylindrical envelope and land on the quartz carrier tube. Since such crystals of cubic SiC will not melt when an optical glass fibre is drawn from the preform that has been collapsed to form a solid rod, the presence of such crystals will lead to a local weakening of the optical glass fibre thus formed, resulting in fracture thereof. It should be understood that the present device comprises the embodiment of a heating element which forms a cylindrical envelope as well as the embodiment of a heating element which surrounds a cylindrical envelope.

In a particularly preferred embodiment, the laminar flow of a non-oxidizing gas in element i) has a Reynolds count of 10–200, wherein the Reynolds count is defined by $Re = \rho v d / \mu$, wherein:

$\rho$ = the gas density, $v$ = the gas velocity, $\mu$ = the gas viscosity, and $d$ = the difference in diameter between the external diameter of the carrier tube and the inner wall of the cylindrical envelope.

This laminar flow is in particular desirable in order to prevent the occurrence of swirls in the space between the carrier tube and the cylindrical envelope, so that any SiC-containing materials that may have formed will be adequately discharged in the direction of the annular outlet opening, thus preventing the deposition of said materials on the carrier tube.

In a particularly preferred embodiment, the aforesaid parameter d has a value>6 mm, as a result of which the diffusion distance of evaporating $SiO_2$ to the carbon inner wall of the furnace is increased.

Furthermore it is preferable to use a gas having a helium content of maximally 15 vol. % as the non-oxidizing gas, wherein the other constituents are selected from argon and nitrogen, for example, or a mixture thereof.

In such a collapse process, helium is frequently used on account of its good heat-conducting properties, because the heat from the cylindrical envelope is thus adequately transferred to the carrier tube to be collapsed. One drawback of the use of helium, however, is the fact that, due to the aforesaid good heat conduction, also strong cooling takes place. Thus, the $SiO_2$ evaporating from the carrier tube can deposit on a larger part of the carbon tube of the cylindrical envelope. Thus, the maximum amount of helium has been selected with a view to minimizing the deposition of evaporated $SiO_2$ from the carrier tube on the carbon tube of the cylindrical envelope.

The device is furthermore characterized in that the inner wall of the cylindrical envelope is made of vitrified carbon. A special advantage of the use of vitrified carbon is the fact that a material having a very low porosity is used, as a result of which the effective potential reaction area is smaller than with the standard high purity carbon. This will result in a reduced combustion of the carbon, thus minimizing any reaction with $SiO_2$. In addition to that, it has become apparent that it is easier to remove any impurities from the vitrified carbon surface.

The present invention furthermore relates to a method wherein a carrier tube is collapsed to a preform, which method is carried out in the above-described device.

The present invention will now be explained in more detail with reference to the appended FIGURE, which schematically shows the present device in cross-sectional view.

The appended FIGURE schematically shows a device 1 for manufacturing a preform, in which a carrier tube 7 is collapsed to a preform. The carrier tube 7 is present between heating elements 2, which provide a temperature so high that the carrier tube 7 will soften slightly and fuse to a solid rod. The space 9 present between the inner wall 3 of furnace 10 and carrier tube 7 is flushed with a non-oxidizing gas, which is injected in the direction indicated by arrow P1 via annular injection chamber 6. Injection chamber 6 is present at the location of the annular inlet opening 5, so that the injected, non-oxidizing gas will flow from the annular inlet opening 5 in the direction of the annular outlet opening 4. In order to prevent the entry of ambient air in the annular inlet opening 5, an element 8 is furthermore provided, which element 8 is disposed upstream of the annular injection chamber 6, which element 8 also comprises an annular injection chamber, which carries a non-oxidizing gas past the carrier tube 7 in a direction opposed to the direction of the non-oxidizing gas from the annular injection chamber 6, in particular in the direction indicated by arrow P2. The combination of the gas curtain obtained via element 8 and the internal flushing process via injection chamber 6 ensures that ambient air is prevented from entering the furnace and that any impurities formed during the collapse process are adequately discharged in the direction of annular outlet opening 4. It should be apparent that the furnace 10 can be moved with respect to carrier tube 7, but that it is desirable in particular embodiments for carrier tube 7 to be moved with respect to furnace 10. The present invention is not restricted to a specific manner of movement, however.

What is claimed is:

1. A device (1) for manufacturing a preform, wherein a carrier tube (7) is collapsed to a preform, which device (1) comprises at least a heating element (2) forming or surrounding a cylindrical envelope (3), which envelope (3) defines an annular inlet opening (5) and an annular outlet opening (4) at opposite ends of the envelope (3), a carrier tube (7) being present within the cylindrical envelope (3), between said openings (4, 5), the heating element (2) being movable in axial direction with respect to the carrier tube (7), and means (6, 8) for supplying a non-oxidizing gas to the space between the carrier tube (7) and the envelope (3), wherein the means (6, 8) for supplying a non-oxidizing gas are disposed near the annular inlet opening (5), said means comprising:

i) an element (6) for flushing the space between the carrier tube (7) and the envelope (3), which element (6), which comprises an annular injection chamber, is disposed near the annular inlet opening (5) and which carries a non-oxidizing gas past the carrier tube (7) in the direction of the annular outlet opening (4) under laminar flow, and ii) an element (8) for supplying a non-oxidizing gas to the annular inlet opening (5), which element (8) is disposed upstream of the element (6) according to i), which element (8) comprises an annular injection chamber, which carries a non-oxidizing gas past the carrier tube (7) in a direction opposed to the direction of the non-oxidizing gas from element (6) so as to prevent the entry of ambient air on the side of the annular inlet opening (5).

2. A device according to claim 1, wherein the laminar flow in element (6) has a Reynolds number ranging between 10 and 200, the Reynolds number being defined by $Re=\rho v d/\mu$, wherein:

$\rho$=the gas density,
   v=the gas velocity,
   $\mu$=the gas viscosity, and
   d=the difference in diameter between the external diameter of the carrier tube (7) and the inner wall of the cylindrical envelope (3).

3. A device according to claim 2, wherein the parameter d has a value>6 mm.

4. A device according to claim 1, wherein the non-oxidizing gas having a He-content of maximally 15 vol. % is used as the non-oxidizing gas.

5. A device according to claim 1, wherein the inner wall of the cylindrical envelope (3) is made of vitrified carbon.

6. A method for manufacturing a preform, wherein the carrier tube (7) is collapsed to a preform, which method is carried out in a device according to claim 1.

* * * * *